United States Patent Office 2,714,597
Patented Aug. 2, 1955

2,714,597
HALO SUBSTITUTED 4(5)-ARYLOXYMETHYL-IMIDAZOLES

Richard U. Scheck, Leo R. Swett and Howard J. Glenn, Waukegan Township, Lake County, Ill., assignors to Abbott Laboratories, North Chicago, Ill., a corporation of Illinois No Drawing. Application August 28, 1952, Serial No. 306,932

13 Claims. (Cl. 260—309)

This invention relates to novel and unusual chemical compositions which are noted for their physiological activity and to a method for making such compositions.

The new compositions of matter to which the invention pertains are those which may be characterized by the chemical formula;

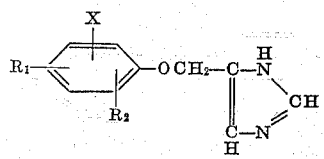

and the acid addition salts thereof, wherein X is halogen and $R_1$ and $R_2$ are selected from the group consisting of hydrogen, halogen, alkyl, alkoxy, and aryl. The term "halogen" is used in its ordinary sense as including fluorine, chlorine, bromine and iodine. The halogen atoms may be attached to the phenyl nucleus at either the ortho, meta or para position.

The term "alkyl," as used in the foregoing formula, is intended to include straight and branch chain hydrocarbon radicals. The methyl, ethyl, propyl, and butyl radicals and their branched chain equivalents are included in this class. The term "alkoxy" includes the methoxy, ethoxy, propoxy, and butoxy radicals and branch chain equivalents. By "aryl" as the term is used herein, it is intended to include the compounds characterized by the phenyl nucleus and substituted phenyl compounds.

The new compositions of this invention, which may be designated as the halo - substituted 4(5)-aryloxymethyl-imidazoles, are prepared by reacting equimolar quantities of metallic sodium in alcohol, and a halo-substituted phenol. The mixture is stirred at room temperature for several hours and then cooled. A half-molar quantity of a 4(5) halo-methylimidazole hydrochloride is added to the reaction mixture with prolonged stirring at room temperature. Thereafter, the normal recovery procedure of filtering and solvent extraction is carried out. We made an unusual finding at this point that a technically pure salt will crystallize directly from a strongly acid solution upon standing. Thus, the expensive formation of the base is obviated and the halo-substituted 4(5)-aryloxymethylimidazole hydrochloride is obtained directly. The details of the method will be set forth in the hereinafter presented examples.

The novel compositions of this invention may be isolated and used as the free bases if desired. Ordinarily, however, it will be preferred to prepare the acid addition salt of the compound and administer it in this form. The acid addition salts are prepared in the usual manner by reacting the base with a mineral acid such as hydrochloric or sulfuric acid. The organic acid salts may also be prepared by a simple reaction between the base and an organic acid such as oxalic, citric or tartaric acid.

The halo-substituted 4(5) aryloxymethylimidazoles are found to have exceptionally potent analgesic activity, and are utilized principally for this property. Some have also shown epinephrine-like vaso activity and others exhibit muscle relaxant activity. The analgesic activity of the compounds is exceptionally strong and is highly unusual and unexpected in view of the fact that compounds of a similar structure which do not contain a halogen on the phenyl nucleus are inactive as analgesics. In addition, our new compounds are notable for their low toxicity.

The invention will be further illustrated by reference to the following examples which are not however, to be construed as limiting the invention in any way.

EXAMPLE I

4(5)-p-bromophenoxymethylimidazole hydrochloride

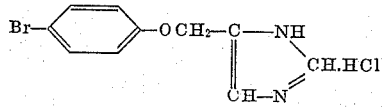

To a solution of 1.5 g. (0.066 mole) of sodium in 75 cc. of dry ethanol was added 11.4 g. (0.066 mole) of p-bromophenol in 25 cc. of ethanol. The solution was stirred for two and one-half hours and then cooled in an ice-hydrochloric acid bath. A solution of 5.0 g. (0.033 mole) of 4(5)-chloromethylimidazole hydrochloride in 50 cc. of ethanol was then added slowly over a period of about twenty minutes with stirring, the mixture was then stirred an additional six hours at room temperature. After filtration to remove the sodium chloride, the alcohol solvent was removed under reduced pressure. To the resulting oil was added 15 cc. of water and 20 cc. of 6 N hydrochloric acid. This solution was extracted with 50 cc. of ether to remove the unreacted phenol. The aqueous phase on standing deposited 4.7 g. (66% of theory) of colorless crystalline 4(5)-p-bromophenoxymethylimidazole hydrochloride, M. P. 190–191° C.

*Anal.*—Calc'd for $C_{10}H_9BrN_2O \cdot HCl$. C, 41.47; H, 3.48; N, 9.68. Found: C, 41.66; H, 3.52; N, 9.83.

EXAMPLE II

4(5) - o - bromophenoxymethylimidazole hydrochloride

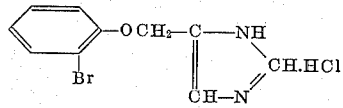

Following the procedure of Example I but using 11.4 g. (0.066 mole) of o-bromophenol, crystalline 4(5)-o-bromophenoxymethylimidazole hydrochloride, M. P. 190–192° C. was obtained in a yield of 56%.

*Anal.*—Calc'd for $C_{10}H_9BrN_2O \cdot HCl$. C, 41.47; H, 3.48; N, 9.68. Found: C, 41.28; H, 3.42; N, 9.66.

EXAMPLE III

4(5)-o-chlorophenoxymethylimidazole hydrochloride

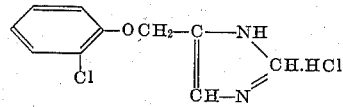

Following the procedure of Example I but using 8.5 g. (0.066 mole) of o-chlorophenol, crystalline 4(5)-o-chlorophenoxymethylimidazole hydrochloride, M. P. 200–201° C., was obtained in a yield of 60%.

*Anal.*—Calc'd for $C_{10}H_9ClN_2O \cdot HCl$: C, 49.00; H, 4.11; N, 11.43. Found: C, 48.92; H, 4.31; N, 11.25.

EXAMPLE IV

4(5)-m-chlorophenoxymethylimidazole hydrochloride

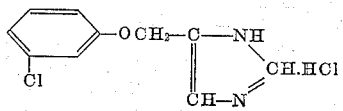

Following the procedure of Example I but using 8.5 g. (0.066 mole) of m-chlorophenol, crystalline 4(5)-m-chlorophenoxymethylimidazole hydrochloride, M. P. 152–154° C. was obtained in 51% yield.

Anal.—Calc'd for $C_{10}H_9ClN_2O \cdot HCl$: C, 49.00; H, 4.11; N, 11.43. Found: C, 48.73; H, 4.07; N, 11.56.

EXAMPLE V

*4(5)-p-chlorophenoxymethylimidazole hydrochloride*

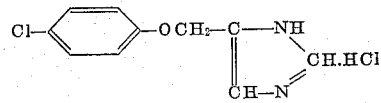

Following the procedure of Example I but using 8.5 g. (0.066 mole) of p-chlorophenol, crystalline 4(5)-p-chlorophenoxymethylimidazole hydrochloride, M. P. 188–190° C. was obtained in 60% yield.

Anal.—Calc'd for $C_{10}H_9ClN_2O \cdot HCl$: C, 49.00; H, 4.11; N, 11.43. Found: C, 48.74; H, 4.24; N, 11.57.

EXAMPLE VI

*4(5)-2,4-dichlorophenoxymethylimidazole hydrochloride*

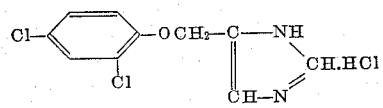

Following the procedure of Example I but using 10.7 g. (0.066 mole) of 2,4-dichlorophenol, crystalline 4(5)-2,4-dichlorophenoxymethylimidazole hydrochloride, M. P. 183–185° C. was obtained in 33% yield.

Anal.—Calc'd for $C_{10}H_8Cl_2N_2O \cdot HCl$: C, 42.96; H, 3.25; N, 10.02. Found: C, 42.80; H, 3.42; N, 10.07.

EXAMPLE VII

*4(5) - 3 - methyl - 4 - chlorophenoxymethylimidazole hydrochloride*

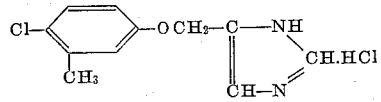

Following the procedure of Example I but using 9.5 g. (0.066 mole) of 3-methyl-4-chlorophenol, crystalline 4(5) - 3 - methyl - 4 - chlorophenoxymethylimidazole hydrochloride, M. P. 190–192° C. was obtained in 66% yield.

Anal.—Calc'd for $C_{11}H_{11}ClN_2O \cdot HCl$: C, 50.98; H, 4.67; N, 10.81. Found: C, 51.07; H, 4.82; N, 10.94.

EXAMPLE VIII

*4(5) - 3,5 - dimethyl - 4 - chlorophenoxymethylimidazole hydrochloride*

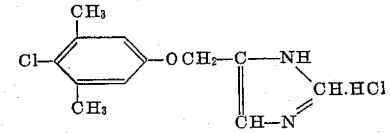

Following the procedure of Example I but using 10.3 g. (0.066 mole) of 3,5-dimethyl-4-chlorophenol, crystalline 4(5)-3,5-dimethyl-4-chlorophenoxymethylimidazole hydrochloride, M. P. 195–196° C. was obtained in 48% yield.

Anal.—Calc'd for $C_{12}H_{13}ClN_2O \cdot HCl$: C, 52.76; H, 5.16; N, 10.26. Found: C, 52.73; H, 5.24; N, 10.33.

EXAMPLE IX

*4(5) - 3 - methyl - 4 - chloro - 6 - isopropylphenoxymethylimidazole hydrochloride*

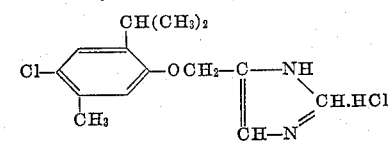

Following the procedure of Example I but using 12.2 g. (0.066 mole) of p-chlorothymol, crystalline 4(5)-3-methyl - 4 - chloro - 6 - isopropylphenoxymethylimidazole hydrochloride, M. P. 194–195° C. was obtained in 44% yield.

Anal.—Calc'd for $C_{14}H_{17}ClN_2O \cdot HCl$: C, 55.82; H, 6.02; N, 9.30. Found: C, 55.98; H, 6.31; N, 9.39.

EXAMPLE X

*4(5)-o-fluorophenoxymethylimidazole hydrochloride*

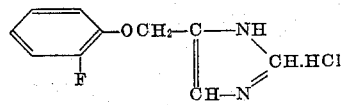

Following the procedure of Example I but using 7.4 g. (0.066 mole) of o-fluorophenol, crystalline 4(5)-o-fluorophenoxymethylimidazole hydrochloride, M. P. 177–179° C. was obtained in a yield of 75%.

Anal.—Calc'd for $C_{10}H_9FN_2O \cdot HCl$: C, 52.52; H, 4.41; N, 12.25. Found: C, 52.31; H, 4.59; N, 12.58.

EXAMPLE XI

*4(5) - 2 - phenyl - 4 - chlorophenoxymethylimidazole hydrochloride*

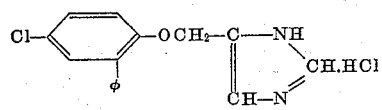

Following the procedure of Example I but using 13.5 g. (0.066 mole) of 2-phenyl-4-chlorophenol, crystalline 4(5) - 2 - phenyl - 4 - chlorophenoxymethylimidazole hydrochloride, M. P. 243–244° C. was obtained in a yield of 23%.

Anal.—Calc'd for $C_{16}H_{13}ClN_2O \cdot HCl$: C, 59.82; H, 4.39; N, 8.72. Found: C, 58.48; H, 4.67; N, 8.88.

EXAMPLE XII

*4(5)-o-iodophenoxymethylimidazole hydrochloride*

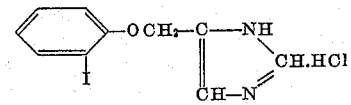

The procedure outlined in Example I is followed substituting 14.5 g. (0.066 mole) of o-iodophenol. Crystalline 4(5)-o-iodophenoxymethylimidazole hydrochloride is obtained.

EXAMPLE XIII

*4(5)-2-methoxy-4-bromophenoxymethylimidazole hydrochloride*

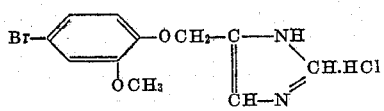

Following the procedure of Example I but substituting 13.4 g. (0.066 mole) of 2-methoxy-4-bromophenol crystalline 4(5)-2-methoxy-4-bromophenoxymethylimidazole hydrochloride is obtained.

Others may practice the invention in any additional way which may be suggested to one skilled in the art. It is intended that such practice be included within the invention, provided, however, that such practice falls within the scope of the appended claims.

We claim:

1. New composition of matter having the formula

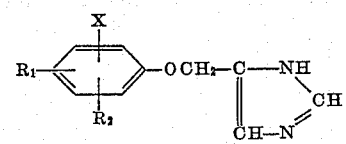

wherein X is halogen and $R_1$ and $R_2$ are selected from the group consisting of hydrogen, halogen, lower alkyl, lower alkoxy, and phenyl.

2. New composition of matter having the formula

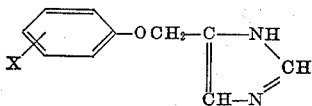

wherein X is halogen.

3. A new composition of matter according to claim 2 in which X is attached to the phenyl nucleus at the ortho position.

4. A new composition of matter according to claim 2 in which X is attached to the phenyl nucleus at the meta position.

5. A new composition of matter according to claim 2 in which X is attached to the phenyl nucleus at the para position.

6. 4(5) o-chlorophenoxymethylimidazole.

7. 4(5) 3-methyl-4-chloro-6-isopropylphenoxymethylimidazole.

8. 4(5) p-chlorophenoxymethylimidazole.

9. 4(5) m-chlorophenoxymethylimidazole.

10. 4(5) o-bromophenoxymethylimidazole.

11. The method of making halogen substituted 4(5)-aryloxymethylimidazoles which comprises reacting equimolar quantities of metallic sodium and a halo-substituted phenol, adding a half-molar quantity of a 4(5) halomethylimidazole hydrochloride with prolonged stirring at room temperature, filtering and removing excess solvent from the filtrate, making the filtrate strongly acidic, extracting the unreacted phenol with ether and allowing the filtrate to stand until the halo substituted 4(5)-aryloxymethylimidazole hydrochloride crystallizes from the aqueous phase.

12. The method of making halo-substituted 4(5)-aryloxymethylimidazoles which comprises reacting equimolar quantities of metallic sodium and halo-substituted phenol, adding a half-molar quantity of a 4(5) halomethylimidazole hydrochloride to the reaction mixture with prolonged stirring at room temperature, and recovering the crystalline halo-substituted 4(5)-aryloxymethylimidazole hydrochloride directly from a strongly acidic solution thereof.

13. Compositions of matter having the formula

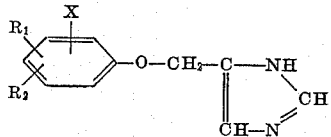

wherein X is halogen, and $R_1$ and $R_2$ are lower alkyl.

References Cited in the file of this patent

Ruoff et al., Jr. Am. Chem. Soc., vol. 72, pp. 4950–3 (1950).

Wheatley et al., Jr. Am. Chem. Soc., vol. 72, pp. 4443–5 (1950).